US006889564B1

(12) United States Patent
Marcotte et al.

(10) Patent No.: US 6,889,564 B1
(45) Date of Patent: May 10, 2005

(54) PEAK FLOW METER

(75) Inventors: Ronald P. Marcotte, Gray, ME (US); Walter Manchester, Windham, ME (US); Donald Henton, Brunswick, ME (US); Donald Parent, Windham, ME (US); Tully Gehan, Portland, ME (US)

(73) Assignee: NewVed, Inc., Gray, ME (US)

( * ) Notice: Subject to any disclaimer, the term of this patent is extended or adjusted under 35 U.S.C. 154(b) by 0 days.

(21) Appl. No.: 09/694,363

(22) Filed: Oct. 23, 2000

(51) Int. Cl.[7] .................................................. G01F 1/28
(52) U.S. Cl. ............................. 73/861.74; 73/861.75; 73/861.76
(58) Field of Search ....................... 73/861.71, 861.74, 73/861.75, 861.76; 600/538; 482/13; 128/716

(56) References Cited

U.S. PATENT DOCUMENTS

| | | | | |
|---|---|---|---|---|
| 5,253,651 A | * | 10/1993 | Stockwell et al. | 128/716 |
| 5,277,195 A | * | 1/1994 | Williams | 482/13 |
| 5,422,057 A | * | 6/1995 | Karbachsch et al. | 264/257 |
| 5,613,497 A | * | 3/1997 | DeBush | 482/13 |
| 6,126,613 A | * | 10/2000 | Edwards et al. | 600/539 |

* cited by examiner

Primary Examiner—Edward Lefkowitz
Assistant Examiner—Lilybett Martir
(74) Attorney, Agent, or Firm—Michael J. Persson; Lawson + Persson, PC (57) ABSTRACT

A peak flow meter for measuring a peak flow or air exhaled by a patient. The preferred peak flow meter includes a substantially hollow housing having a top portion, a bottom portion, an air inlet and at two air outlets. A flow restriction is disposed within the housing and in fluid communication with the air inlet. A vane assembly is disposed within the housing and includes a vane, a post to which the vane is fixedly attached, and a hub attached to the bottom portion of the housing. A torsion spring is engaged at one end to the hub and at the other to the post A visual indictor is movably disposed within the slot for indicating a peak flow rate of air based upon a movement of the vane and a scale is disposed proximate to the slot such that the location of the visual indicator may be related to a corresponding flow rate.

6 Claims, 6 Drawing Sheets

PEAK FLOW METER

FIELD OF THE INVENTION

The present invention relates to the field of spirometry and, in particular, to a portable peak flow meter and kit for measuring the peak flow of air exhaled by a user.

BACKGROUND OF THE INVENTION

Asthma is a disease that effects about 4% of the population of the United States or about 15 million people. The incidence of asthma has grown at an alarming rate, up nearly 75% in the past decade. It is a very complex disease, having multiple etiologies involving inflammatory cells, mediators, and the cells and tissues that line airways. Symptoms are many and varied including wheezing, shortness of breath, chest tightness and cough. Several classes of medications have been developed to combat asthma such as beta agonists, anti-inflammatory and anti leukotrienes. Aggressive management plans have been designed that include medication, monitoring and lifestyle adjustments to maintain patients at optimal levels of health.

The diagnosis of asthma includes a thorough history and physical exam as well as objective tests of pulmonary function using simple spirometry. Evidence of reversible airway obstruction is a hallmark of the disease. Occasionally patients do not present with airway obstruction at the time of exam. In these cases, asthma is confirmed by a positive response to the inhalation of methacholine, a known asthma provocateur.

Asthma is typically monitored using a simple device to measure Peak Expiratory Flow Rate (PEFR). Peak flow meters are widely used for this purpose. Peak flow meters measure the muscular effort to exhale forcibly from fully inflated lungs as well as the elastic recoil of the lungs and airways function. Thus, peak expiratory flow rate is a simple expression of a complex process of lung emptying.

A wide variety of peak flow meters are commercially available and many more have been patented, but not commercialized. One popular type of peak flow meter is the linear, or "in-line", peak flow meter. These flow meters typically include a cylindrical housing with an air inlet having an integral air restrictor at one end, an air outlet at the other end, and slot into which an indicator is movably disposed. A piston is disposed within the housing and in contact with a compression spring. When the user blows into the housing, the flow restrictor restricts the flow of air and the piston moves against the force of the air, causing it to move the indicator within the slot as the spring is compressed. When airflow is ceased, the spring forces the piston back to its original position, but the indicator remains at its "peak flow" position within the slot. The position of the indicator is then compared to graduations along the side of the slot to determine the "peak flow" of air from the user.

Although these flow meters are relatively popular, they have a number of drawbacks. First, in order to obtain an acceptable level accuracy, a relatively long spring and housing must be utilized, making the meter cumbersome to transport. Second, the arrangement of the spring, and variations in effective lengths due to manufacturing tolerances, makes these meters difficult to zero. Accordingly, these meters require the use of springs with extremely tight manufacturing tolerances. Third, the location of the air outlet at the end of the meter makes them prone to blockage or influence by the fingers of the user, resulting in corruption of test results. Finally, the location of the air restrictor within the air outlet makes them prone to blockage or influence as well, again resulting in corruption of test results.

A second type of peak flow meter is the "electronic type" of peak flow meter. These meters are typically battery powered and electronically measure the pressure drop across a flow restriction. This peak flow of air from the user is then displayed on a liquid crystal display, or other visual display, and may be stored for later download into a personal computer or other electronic device.

Electronic peak flow meters are relatively accurate and are easy to use. However, they are also generally too large to be truly portable and are much more expensive than non-electronic versions. Further, these units will not operate without properly charged batteries, creating the risk that user will not detect the onset of an asthmatic attack when the batteries are low or completely depleted.

A third type of peak flow meter is the "rotary" peak flow meter. An example of a "rotary" peak flow meter is currently marketed by the assignee of the present invention, Spirometrics, Inc. of Gray, Me., under the trademark "SPIRO-FLOW™". Rotary peak flow meters typically include a relatively thin rectangular housing having an air inlet at one end, an air outlet having an integral air flow restriction extending from the other, and a semicircular slot disposed along the side of the housing into which an indicator is movably disposed. A vane assembly is rotatably attached to a torsion spring and is dimensioned such that it interferes with the indicator when it is rotated. The torsion spring is fixedly attached to the housing and is oriented to counteract the force of the air on the flag when the user blows into the housing. In operation, the flag is caused to rotate by the force of the air, causing the indicator to move within the slot. When airflow is ceased, the torsion spring causes the flag to rotate back to its original position, but the indicator remains at its "peak flow" position within the slot. The position of the indicator is then compared to graduations along the side of the slot to determine the "peak flow" of air from the user.

Rotary peak flow meters do not require the use of long compression springs to operate and, therefore, can be made small enough to be truly portable. However, conventional rotary peak flow meters are not without drawbacks. First, the accuracy of the measurement is dependent, in part, upon the relative positions of the ends of the torsion spring. Given the tolerances inherent in the process of manufacturing the torsion springs, the variation in this positioning can result in significant inaccuracies. These inaccuracies can be counteracted by customizing each scale for each particular spring. However, this process requires that each unit be tested to generate the values for this custom scale, causing a corresponding increase in cost. Second, like the linear, or "in-line", peak flow meters, rotary peak flow meters include a single air outlet. As was the case with these meters, this outlet is prone to blockage by the finger of the user, resulting in corruption of test results. Finally, the location of the air flow restriction within the air inlet makes them prone to the same corruption as their linear counterparts.

Therefore, there is a need for a peak flow meter that is small enough to be truly portable, that is sufficiently accurate and repeatable to provide meaningful results, that does not require a customized scale to provide the necessary level of accuracy, that is not prone to corruption of test results through blockage by a user's finger of the air outlet or flow restrictor, that may be manufactured and sold at a relatively low cost, and that does not require the use of batteries.

SUMMARY OF THE INVENTION

The present invention is a peak flow meter for measuring a peak flow or air exhaled by a patient. In its preferred form, the peak flow meter includes a substantially hollow housing having a top portion, a bottom portion, an air inlet and two air outlets. A flow restriction is disposed within the housing and in fluid communication with the air inlet.

A vane assembly is also disposed within the housing and preferably includes a vane, a post to which the vane is fixedly attached, and an adjustable hub that is rotatably attached to the bottom portion of the housing. A torsion spring is fixedly engaged at one end with the hub and at the other end with the post of the vane assembly. The adjustable hub is dimensioned to allow the post to be rotated to a predetermined position relative to the ends of the torsion spring in order to compensate for differences in the relative positions of the ends of the spring caused by manufacturing tolerances.

A slot is preferably disposed through the top portion of the housing and forms an arc about an axis defined by a centerline of the post of the vane assembly. This preferred arc subtends an angle of more than one hundred and eighty degrees in order to provide enhanced resolution. A visual indictor is movably disposed within the slot for indicating a peak flow rate of air based upon a movement of the vane. The preferred visual indicator is a unitary plastic indicator that is dimensioned to be moved by the vane when the vane is rotated by the stream of air and to maintain a peak flow position within the slot upon cessation of the stream of air. Finally, a scale is disposed proximate to the slot such that the location of the visual indicator may be related to a corresponding flow rate.

In operation, a user blows a stream of air into the air inlet. A first portion of the stream of air passes through the flow restriction and is vented through the air outlets. A second portion of the stream of air contacts the vane and causes the vane to rotate against the torsion spring. The vane then contacts the indicator and moves it along the slot. Upon cessation of the stream of air, the indicator remains in its furthermost position. The location of the indicator relative to the scale indicates a numerical value of peak flow rate of the stream of air.

Therefore, it is an aspect of the invention to provide a peak flow meter that is small enough to be truly portable.

It is a further aspect of the invention to provide a peak flow meter that is sufficiently accurate and repeatable to provide meaningful results.

It is a further aspect of the invention to provide a peak flow meter that does not require a customized scale to provide the necessary level of accuracy.

It is a further aspect of the invention to provide a peak flow meter that is not prone to corruption of test results through blockage of the air outlet or flow restrictor by a user's finger.

It is a further aspect of the invention to provide a peak flow meter that may be manufactured and sold at a relatively low cost.

It is a still further aspect of the invention to provide a peak flow meter and that does not require the use of batteries.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

Figure 1:
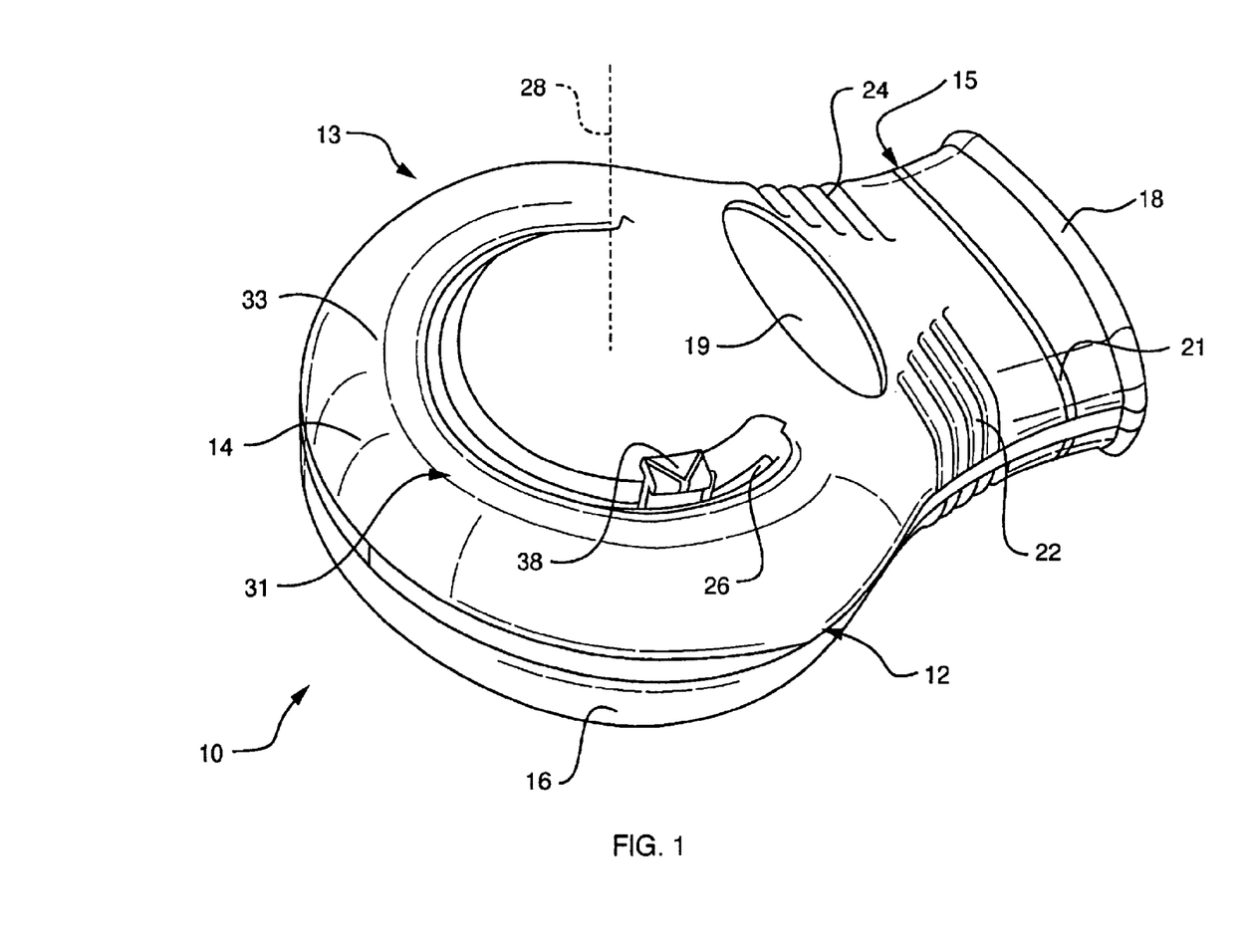
FIG. 1 is an isometric view of the one embodiment of the peak flow meter of the present invention.
Figure 2:
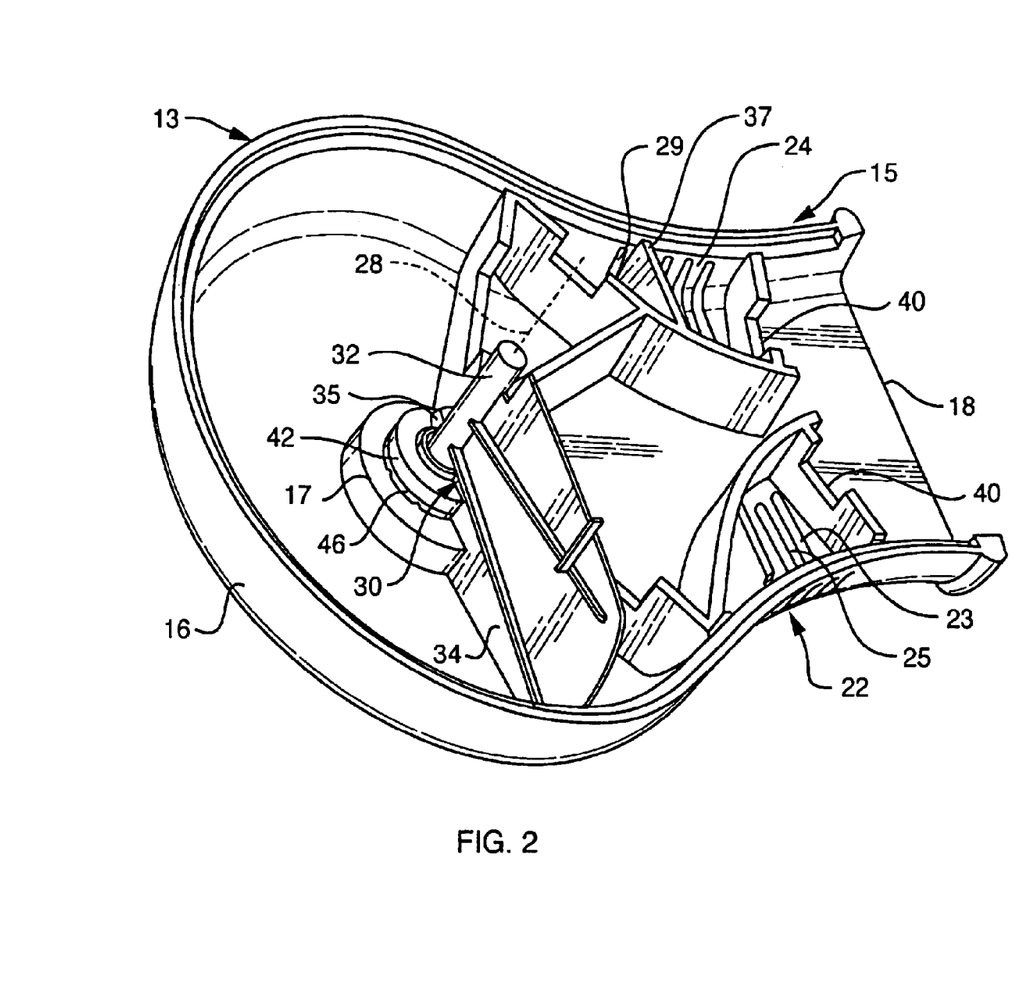
FIG. 2 is an isometric view of the embodiment of FIG. 1 in which the top portion of the housing has been removed to reveal the vane assembly.

Referring first to FIGS. 1 and 2, one embodiment of the preferred peak flow meter 10 of the present invention is shown. In the embodiment of FIGS. 1 and 2, the peak flow meter 10 includes a substantially hollow housing 12 having a top portion 14, a bottom portion 16, an air inlet 18 and two air outlets 22, 24. A vane assembly 30 is disposed within the housing 12 and includes a vane 34, a post 32 to which the vane 34 is attached, a hub 42 that is attached to the bottom portion 16 of the housing 14. A torsion spring (shown in FIG. 4) that is disposed between the hub 42 and the post 32, and a mechanical indicator 38 is provided for indicating a peak flow of air into the meter 10.

The housing 12 preferably includes a disc-like measurement portion 13 and an elliptical flow portion 15 that includes the air inlet 18 and the two air outlets 22, 24. In the preferred embodiment, finger pads 19 are provided on the top portion 14 and bottom portion 16 of the housing 12 in order to reduce the risk that the air outlets 22, 24 will be covered by a user's finger. Similarly, the preferred housing 12 includes a raised ridge 21 that indicates the maximum insertion point of the air inlet 18 into a user's mouth, which also acts to prevent inadvertent covering of the air outlets 22, 24. However, some embodiments of the housing 12 may take different shapes, and may or may not include the finger pads 19 and ridge 21 of the preferred embodiment. For example, some embodiments may include a rectangular or triangular measurement portion 13, while still others may utilize round, square, triangular, or hexagonal flow portions 15.

The housing 12 is preferably formed of a thermoplastic, such as a polystyrene or ABS. These materials are preferred for a number of reasons. First, these materials are capable of withstanding dishwasher cleaning, which typically involves exposure to temperatures of about one hundred and sixty degrees Fahrenheit for periods of about an hour, without deformation or swelling of the material. This ability to thoroughly clean the meter 10 in the dishwasher is unique to the present invention and is important in preventing the growth of bacteria therein. Second, each of these materials can be molded to achieve a very smooth finish, allowing mechanical embodiments of the indicator 38 to slide smoothly within the slot 26. Finally, these materials may be purchased at low cost, are aesthetically pleasing, are easily moldable and ultrasonically weldable, and provide sufficient mechanical strength to withstand use by children and adolescents. Notwithstanding the fact that it is preferred that the housing be made of a thermoplastic material, such as polystyrene or ABS, it is also understood that the housing 12 may be made of other art recognized materials common to the field of peak flow meters 10.

The peak flow meter 10 includes at least one flow restriction 40 to create a back pressure within the housing 12. Such a flow restriction 40 is dimensioned to provide a necessary level of back pressure while preventing undue limitation of the high end of the peak flow scale. In the embodiment of FIGS. 1 and 2, a pair of flow restrictions 40 are disposed within, and formed integral to, the flow portion 15 of the housing 12 at a location between the air inlet 18 and measurement portion 13 of the housing 12. This internal disposition of the restrictions 40 eliminates the risk of blockage by the user and the attendant corruption of the test data.

Because of the inclusion of this internal flow restriction 40, the air outlets 22, 24 of the preferred housing are dimensioned to prevent any substantial restriction to the flow of air exiting the meter 10. Accordingly, the preferred air outlets 22, 24 include generously sized openings 23 that are protected by grill members 25. These grill members 25 are disposed such that it is difficult to completely cover either of the air outlets 22, 24 with a finger.

Although the preferred embodiment of the meter 10 utilizes two internally disposed flow restrictions 40 and two air outlets 22, 24, it is recognized that other embodiments may utilize a single flow restriction 40, or multiple flow restrictions 40 to achieve similar results. Likewise, in some embodiments, the flow restriction 40 is not formed integral to the housing 12, but rather is a separate piece that may be disposed within the flow portion 13 of the housing 12, at the air inlet 18, or at a separate air outlet (not shown).

The preferred housing 12 also includes a back vent 29, disposed adjacent a flow barrier 37 and opposite one of the air outlets 24, for venting air from the backside of the vane 34. The inclusion of such a back vent 29 is preferred in order to relieve the pressure on the back side of the vane 34, and corresponding torque acting to reduce the travel or swing of the vane 34. This back side pressure is most significant as the vane 34 approaches its maximum travel. This is due to the fact that the slot 26 is generally effective as a backside vent for small swing angles but, at maximum vane 34 travel, there is little slot 26 remaining to vent air from the back side of the vane 34. The resulting back side pressure tends to lower the performance curve such that readings obtained at high flows with a back vent 29 are actually higher than readings obtained without the vent 29.

It is recognized that back side pressure is not entirely detrimental and may be used to advantage. This is due to the fact that a fully linear curve forces a compromise between resolution at the low end and the ability to read a high end flow. With a linear scale 31, actuation pressure must be reduced to keep the vane 34 from overtravel, commonly referred to a "pegging", at high flows. However this reduction of actuation pressure leads to poor low flow performance. Lowering the top end of the curve permits good resolution at the low end while suppressing the travel at the higher flows. Testing has shown that this suppression of travel does not have a significant negative impact on the accuracy on high flows. Accordingly, in order to achieve optimal instrument performance, the preferred back vent 29 is designed to vent air at a rate that prevents the vane 34 from pegging while allowing for accurate measurements to be made at the lowest flows.

In the preferred peak flow meter 10, a slot 26 is disposed through the top portion 14 of the housing 12 and forms an arc about an axis 28 defined by a centerline of the post 32 of the vane assembly 30. As shown in FIG. 1, the preferred slot 26 forms an arc that subtends an angle of more than one hundred and eighty degrees. This allows for a greater distance between graduations 33 on the scale 31 that is disposed proximate to the slot 26, providing enhanced measurement resolution. In fact, test results have indicated that the inclusion of this extended slot 26 allows the peak flow meter 10 of the present invention to meet American Thoracic Society (ATS) standards for accuracy and repeatability of peak flow meters. However, in other embodiments, a slot 26 that forms an arc that subtends and angle less than, or equal to, one hundred and eighty degrees may be utilized, provided there is sufficient space for the scale 31 to allow readable and repeatable measurements within a desired flow range, even if such measurements do not meet ATS standards.

In the embodiment of FIG. 1, a mechanical visual indictor 38 is movably disposed within the slot 26 for indicating a peak flow rate of air. Such a mechanical indicator 38, must be designed to allow the indictor 38 move substantially freely within the slot 26, while maintaining its peak flow position in the slot 26 upon cessation of the stream of air. In the preferred embodiment, the location of the slot 26 in the top portion 14 of the housing 12 tends to eliminate gravitational forces upon the indictor 38, such as those encountered when the slot is located upon the side of the meter 10 during operation. This location of the slot 26, and the attendant reduction in gravitational forces that would tend to cause the indicator 38 to move within the slot 26, allows the retention force generated by the indicator 38 to be significantly reduced.

In embodiments utilizing a mechanical indicator 38, it is preferred that the indictor 38 be of very low mass so as to contribute little to the overall inertia of the system. By utilizing an indicator having low mass, and consequently low inertia, the indicator 38 has less of a tendency to continue moving along the slot 26 upon cessation of the airflow within the meter 10. In the preferred embodiment, the indicator 38 is designed to contribute between eleven and twenty-six $gmm^2$ to the overall inertia of the vane assembly 30. However, it is recognized that other embodiments of the meter 10 may have indicators 38 having higher or lower overall inertial contributions and still achieve acceptable results.

Figure 3:
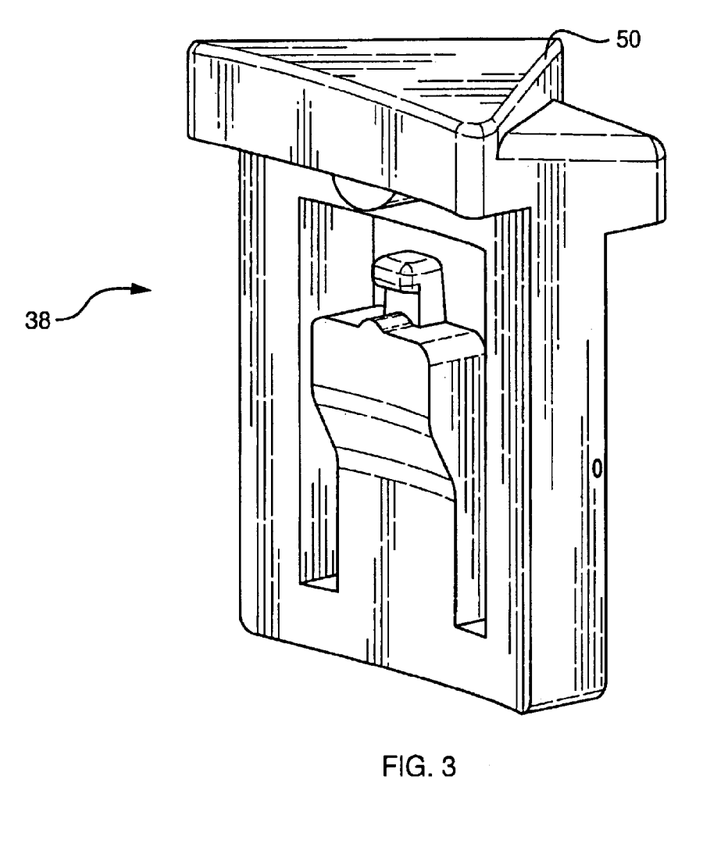
FIG. 3 is an isometric view of one embodiment of the indictor of the peak flow meter of the present invention.
Figure 7:
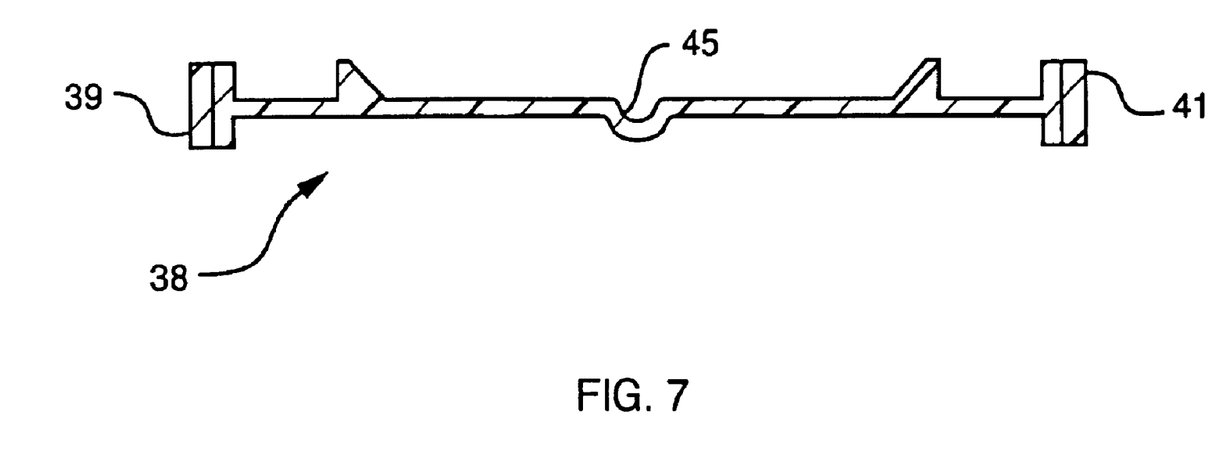
FIG. 7 is a side view of the preferred indicator prior to bending into its operating position.

As described more fully with reference to FIG. 3, the visual indicator 38 of the embodiment of FIG. 1 is a unitary plastic indicator 38 having a flexible tab 48 for maintaining the indicator 38 at a peak flow position within the slot 26 upon cessation of said stream of air. The indicator of FIG. 3 also includes a pointer 50 that is oriented within the slot 26 such that it points toward the graduations 33 on the scale 31. In the preferred embodiment, a standard unitary plastic indicator 38, having a living hinge design, similar to those currently utilized in other peak flow meters, is utilized. As shown in FIG. 7, such an indictor 38 includes a pair of ends 39, 41 that are folded together about a central notch 45. Once folded in this manner, the indicator 38 is readily movable along the slot, but the tendency of the plastic to flex outward causes the indicator 38 to remain at its peak flow position.

In other embodiments, a spring-loaded mechanical indicator 38, such as those commonly utilized in other peak flow meters, may be utilized. Further, although mechanical visual indictors 38 have heretofore been described, it is also recognized that the indictor 38 may take the form of an electronic indictor that senses the position of the vane 34 of the vane assembly 30 and indicates the peak flow rate via a liquid crystal, or other art recognized display. In these embodiments, the slot 26 is unnecessary and, hence, is eliminated from the top portion 14 of the housing 12.

Figure 4:
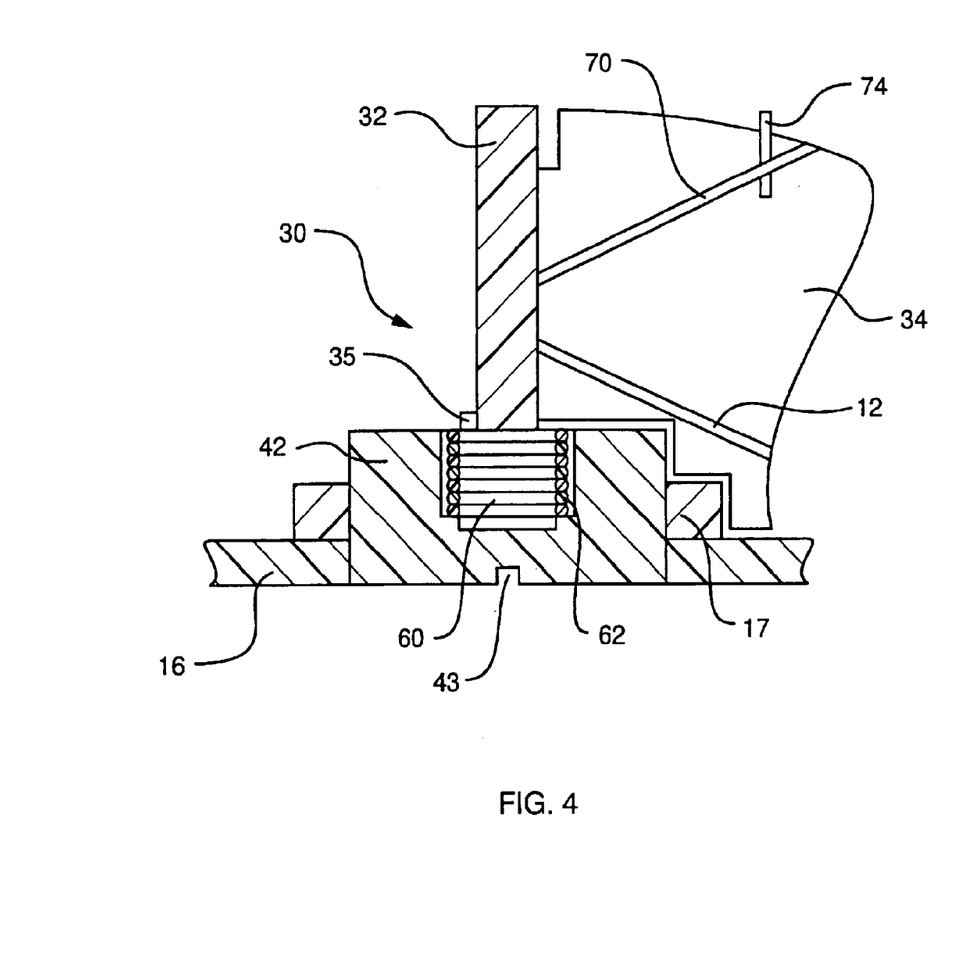
FIG. 4 is a cut away side view of the preferred peak flow meter showing of the relationship between the bottom portion of the housing, the spring, and the vane assembly.

As shown in FIGS. 2 and 4, the preferred vane assembly 30 is disposed within the housing 12 and includes a vane 34, a post 32 to which the vane 34 is fixedly attached, and an adjustable hub 42 that is engaged with the bottom portion 16 of the housing 12 via a mating detail 17. The adjustable hub 42 is dimensioned to accept and secure one end 62 of a torsion spring 60 (shown in FIG. 4) and to press fit within an opening and corresponding mating detail 17 in the bottom portion 16 of the housing 12. In the preferred embodiment, the mating detail 17 includes a plurality of ribs 46 about its inner circumference in order to enhance the press fit with the hub 42. However, in other embodiments, the outer circumference of the adjustable hub 42 includes ribs, while in still other embodiments the mating detail 17 and hub 42 are substantially smooth. The bottom of the adjustable hub 42 will typically include a slot 43 to accept a screwdriver, Allen wrench, or the like, which allows the location of the end 62 of the torsion spring 60, and consequently the position of the vane assembly 30, to be adjusted once the hub 42 has been press fit within the mating detail 17.

The post 32 is rotatably captured at one end within the adjustable hub 42 and includes a catch 35 dimensioned to accept and secure the second end of the torsion spring 60. In the preferred embodiment, the post 32 and vane 34 are formed integral to one another from a thermoplastic material. However, in other embodiments, the post 32 and vane 34 are formed separately and are attached via glue, mechanical fastening, ultrasonic welding or the like.

The preferred vane 34 is dimensioned to approximate the inside dimension of the housing and includes a pair of stabilizing ribs 70, 72. In order to reduce the rotational inertia of the assembly 30, it is preferred that the vane 34 be extremely thin. This is preferred so as to prevent inertial overshoot of the vane 34, and corresponding high peak flow readings. In the preferred embodiment, the vane 34 is 0.010 inches thick and contributes approximately forty gmm$^2$ to the overall inertia of the vane assembly 30. However, in other embodiment, the thickness and mass of the vane 34 may be altered to achieve similar results.

In the preferred embodiment, the vane 34 contacts the indictor 38 via a tab 74 that extends upward from the rib 70 at a position along the vane 34 that corresponds to the position of the slot 26 in the top portion of the housing. However, in other embodiments, the tab 74 is eliminated, and an extension (not shown) is provided from the indicator such that the bottom of the extension is below the top of the vane 34.

The preferred torsion spring 60 is a manufactured of stainless steel having a diameter of 0.012 inches and is formed into eight active coils having a separation of between 0.006 inches and 0.009 inches between coils and an outer diameter of 0.169 inches. However, it is recognized that a wide variety of torsion springs 60 may be utilized. The selection of such a spring 60 is based upon a number of variables, including the size of the vane 34, the size of the air flow restrictions 40, and the printed scale 31 on the unit. Therefore, the above specifications should be understood as being illustrative of one embodiment, but not limiting the overall scope of the claims with respect to the spring.

Once the preferred vane assembly 30 has been assembled, the post 32 may be rotated to a predetermined position, preferably corresponding to a zero graduation 33 on the scale 31. In this manner, the position of the vane 34 may be adjusted in order to compensate for differences in the relative positions of the ends 62, 64 of the spring 60 caused by manufacturing tolerances.

Although the preferred peak flow meter includes an adjustable hub 42, it is recognized that other embodiments of the invention may include a fixed hub. In some embodiments, for example, the position of the vane 34 may be adjusted via a press fit between the vane 34 and post 32. In other embodiments, the post 32 may be adapted to allow adjustment of the vane 34. In other embodiments, the vane assembly 30 is not adjustable and the variations in the initial positions of the vane 34 are compensated for via adjustments in the positioning of the scale 33. In still other embodiments, torsion springs 60 manufactured to more exacting tolerances are utilized in order to eliminate the need to adjust the position of the vane assembly 30.

In operation, a the peak flow meter is held in the hand and brought to the mouth of the user, who blows a stream of air into the air inlet 18 of the housing 12. A first portion of the stream of air passes through the flow restrictions 40 and a second portion of the stream of air is vented through the air outlets 22, 24. The first portion of the stream of air contacts the vane 34 and causes the vane 34 to rotate against the torsion spring 60. The vane 34 then contacts the indicator 38 and moves it along in the slot 26. Upon cessation of the stream of air, the indicator 38 remains in its furthermost position within the slot 26. The location of the indicator 38 relative to the graduations 33 on the scale 31 indicates a numerical value corresponding to the peak flow rate of the stream of air.

Figure 5:
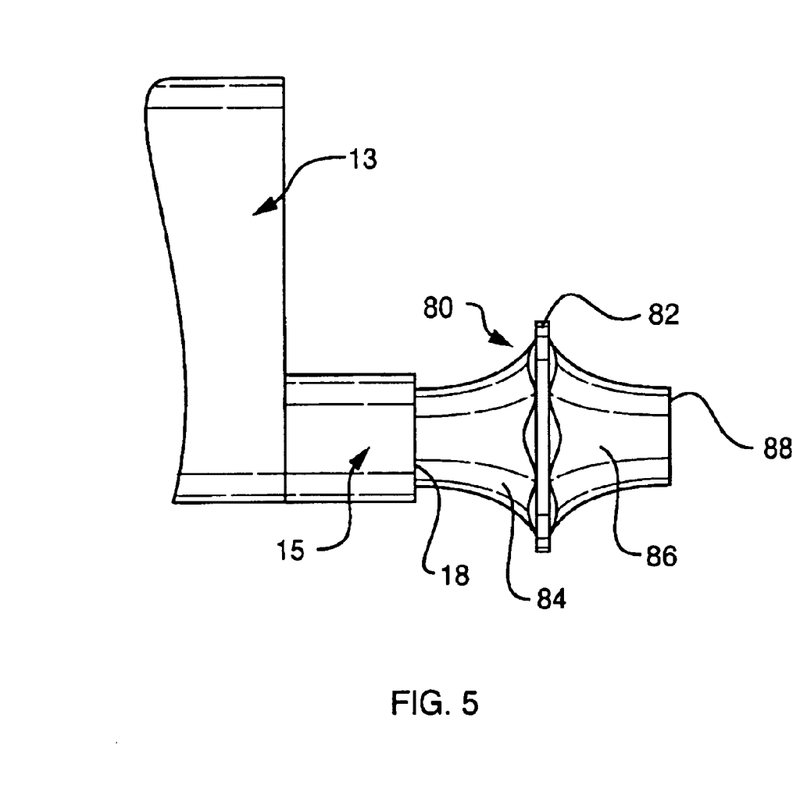
FIG. 5 is a side view of one embodiment of the peak flow meter utilizing an air filter assembly.
Figure 6:
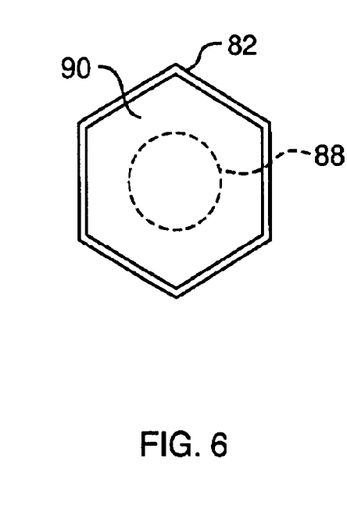
FIG. 6 is an end view of the preferred air filter assembly utilizing a hidden line to show a second end of the assembly.

Referring now to FIGS. 5 and 6, an alternative embodiment is shown in which the peak flow meter 10 is provided with an air filter 80. The preferred air filter 80 is a disposable plastic filter 80, which includes two substantially cylindrical end portions 84, 88 and a hexagonal central filter portion 82 into which the hexagonal filter 90 is disposed. The filter 90 may be manufactured of any conventional filter media, but is preferably manufactured of a composition of polypropylene and modified acrylic that results in a filter having electrostatic properties. In the preferred embodiment, the end portions 84, 88 and filter portion 82 are thermoformed. However, in other embodiments, they may be injection molded or manufactured using other art recognized techniques.

A hexagonal central filter portion 82 is preferred for a number of reasons. First, the hexagonal shape is unique and is aesthetically pleasing. Second, this shape reduces filter waste over that produced when manufacturing circular filters. Third, the hexagonal shape provides enhanced flow characteristics over conventional square filters. Finally, this shape reduces shipping costs by allowing the filters to be nested within one another during shipping.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A peak flow meter comprising:
   a substantially hollow housing consisting of a top portion having a slot and a scale disposed proximate to said slot, a bottom portion, an air inlet and at least one air outlet;
   a flow restriction disposed within said housing and in fluid communication with said air inlet, said flow restriction being dimensioned to create a back pressure within said housing;
   a vane assembly disposed within said housing, said vane assembly comprising a vane, a post to which said vane is fixedly attached, and an adjustable hub attached to said bottom portion of said housing, wherein said adjustable hub is dimensioned to allow said post to be rotated to a predetermined position;

a torsion spring comprising a first end engaged with said adjustable hub and a second end engaged with said post; and an indicator for indicating a peak flow rate of air based upon a movement of said vane, wherein said indicator is a visual indictor movably disposed within said slot, said visual indicator being dimensioned to be moved by said vane when said vane is rotated by said stream of air and to maintain a peak flow position within said slot upon cessation of said stream of air;

wherein a user blows a stream of air into said air inlet, a first portion of said stream of air passes through said flow restriction and is vented through said at least one air outlet, a second portion of said stream of air contacts said vane and causes said vane to rotate against said torsion spring, and said indicator indicates the peak flow rate of said stream of air based upon said movement of said vane.

2. The peak flow meter as claimed in claim 1 wherein said visual indicator is a unitary plastic indicator having a flexible tab for maintaining said peak flow position within said slot upon cessation of said stream of air.

3. The peak flow meter as claimed in claim 1 wherein said slot forms an arc about an axis defined by a centerline of said post of said vane assembly, said arc subtending an angle of more than one hundred and eighty degrees.

4. The peak flow meter as claimed in claim 1 wherein said at least one air outlet comprises two air outlets disposed within a flow portion of said housing, said air outlets being dimensioned to allow air to freely exit said housing, and wherein said housing further comprises a back vent.

5. The peak flow meter as claimed in claim 1 further comprising an air filter assembly removably attached to said air inlet.

6. The peak flow meter as claimed in claim 5 wherein said air filter assembly comprises a substantially hexagonal filter portion.

* * * * *